Jan. 10, 1967  G. CRANSKENS ET AL  3,296,951
PHOTOCOPYING APPARATUS
Filed April 21, 1964  6 Sheets-Sheet 1

GEORG CRANSKENS
WERNER SALGER
*Inventors.*

Karl G. Ross
AGENT

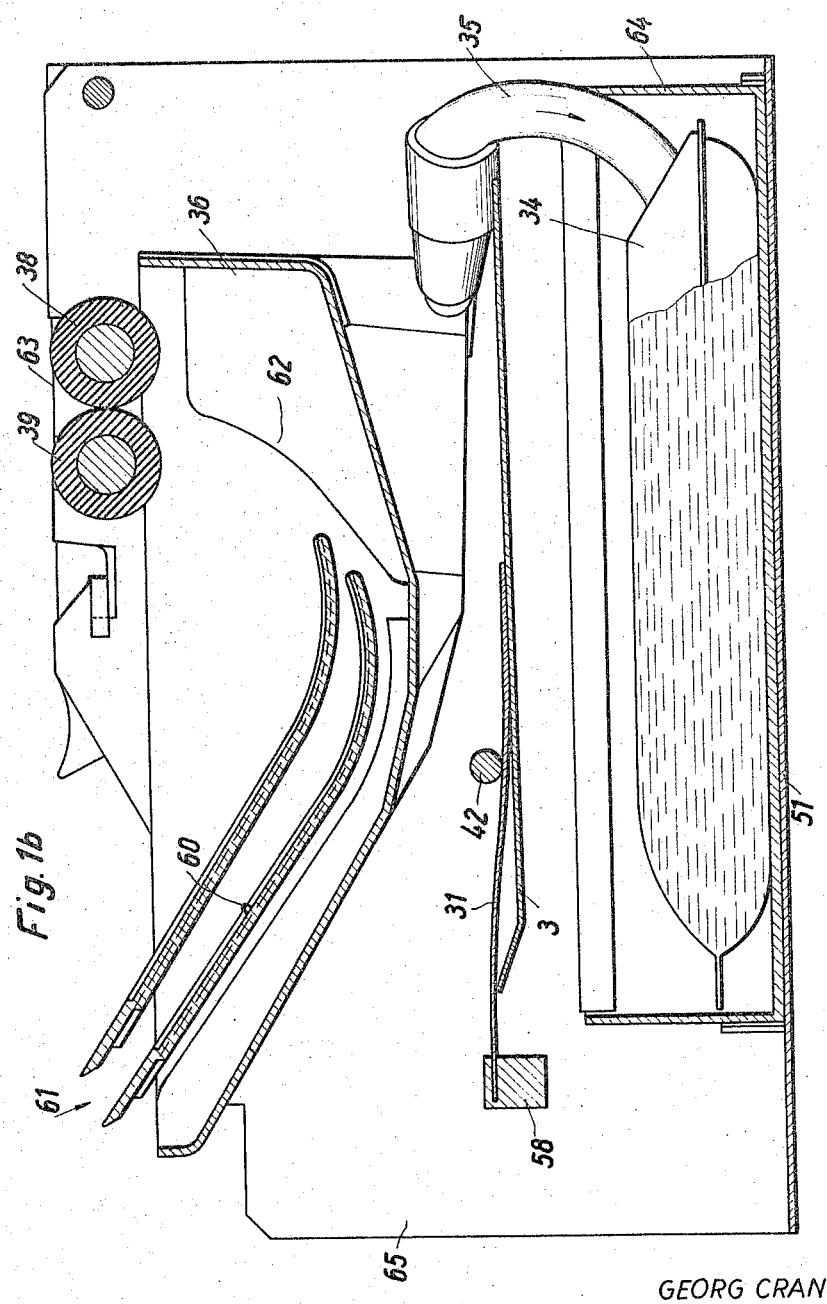

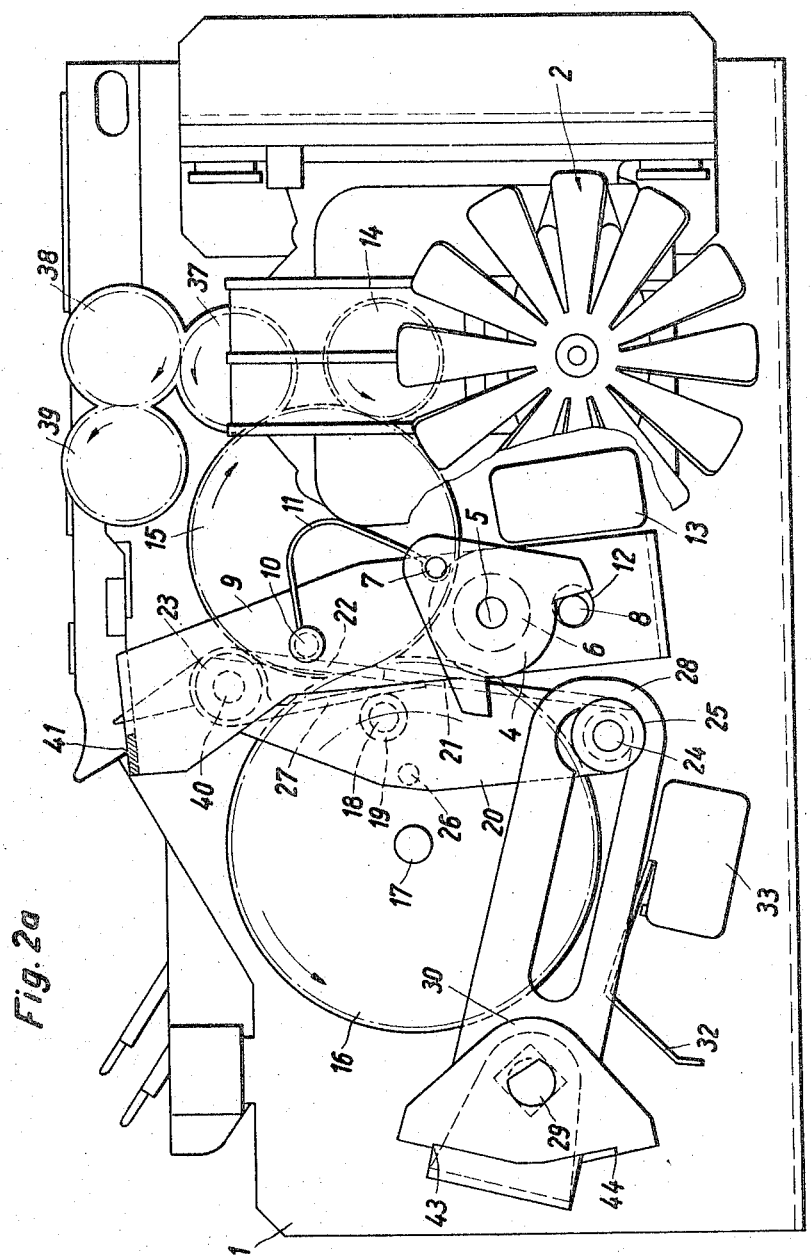

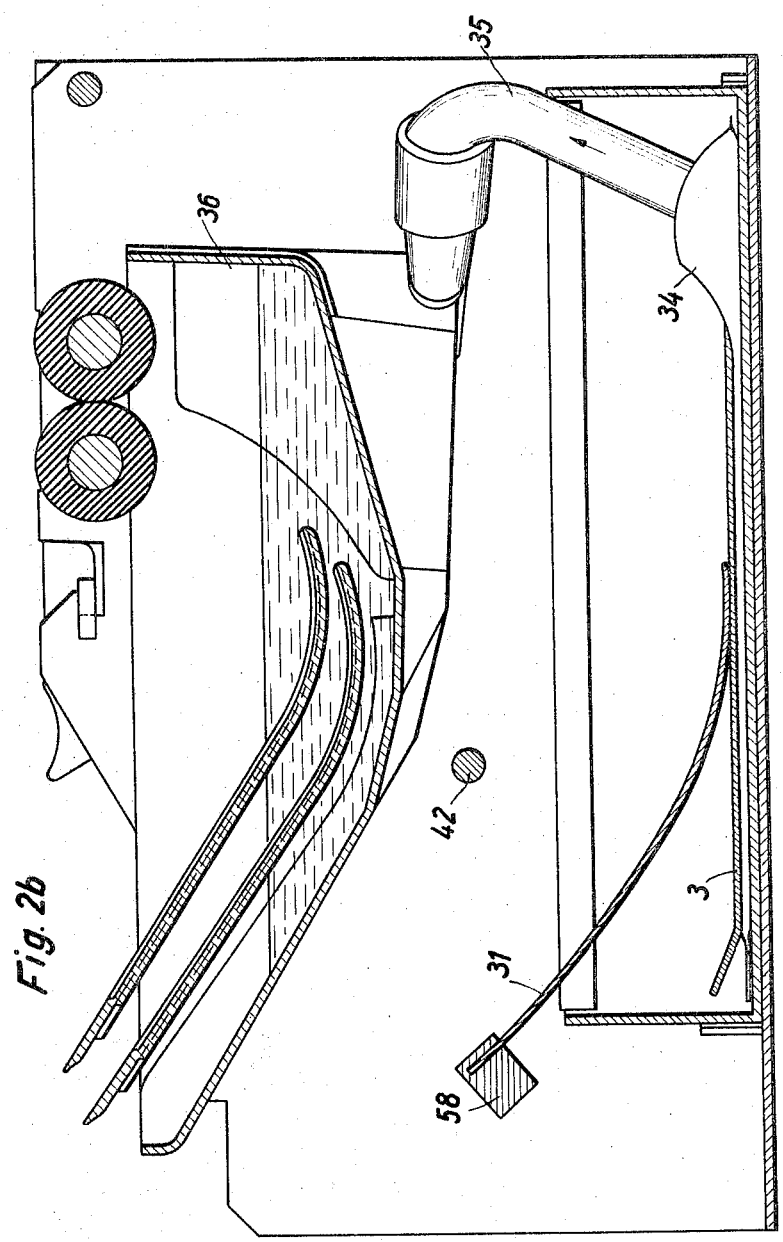

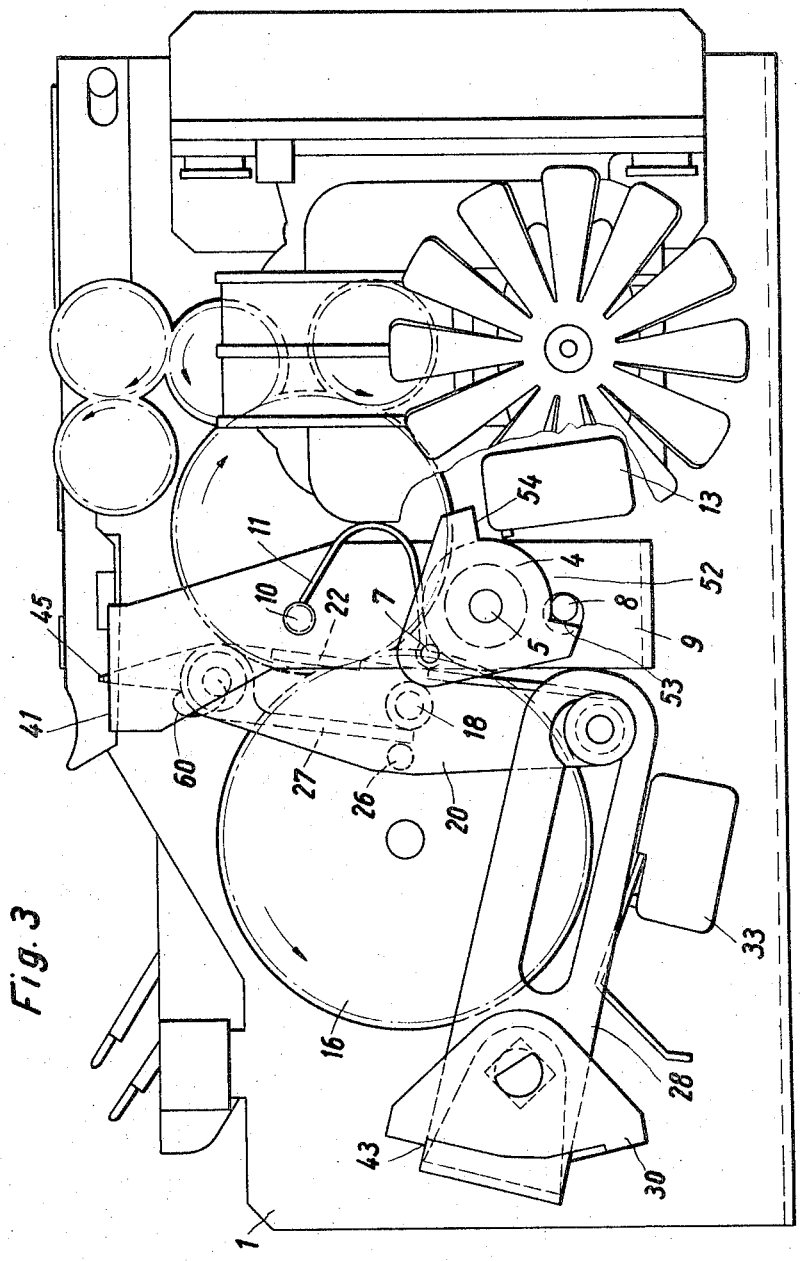

United States Patent Office 3,296,951
Patented Jan. 10, 1967

3,296,951
PHOTOCOPYING APPARATUS
Georg Cranskens, Wedel, Holstein, and Werner Salger, Hamburg-Langenhorn, Germany, assignors to Lumoprint Zindler K.G., Hamburg, Germany
Filed Apr. 21, 1964, Ser. No. 361,494
Claims priority, application Germany, Apr. 27, 1963, L 44,768
12 Claims. (Cl. 95—89)

The present invention relates to a photocopying apparatus of the type which includes a drive motor for driving transport members, such as squeezing and transport roller of a developer device, and an operating element arranged to be operated on starting and stopping of the apparatus, such operating element being movable through only a predetermined angle. The operating member may for example be a lever controlling the emptying and refilling of a supply container associated with a developer dish or tray.

The preferred embodiment of the invention is a copying apparatus with a supply container.

In that case the operating element may be used for swinging the supply container.

However, the supply container is preferably of a known type and comprises a flexible housing which can be compressed by a spring-loaded pressure plate and after termination of a copying operating is permitted to expand by the raising of the pressure plate.

It is known to provide a special hand lever for adjustment of the spring pressure plate. The movement of such a hand lever requires considerable force, since the supply container cannot be discharged instantaneously but in practice the spring pressure plate is stressed against the supply container, which discharges uniformly and allows slackening of the spring pressure plate accordingly.

This operation is therefore difficult, particularly for women. It requires in general a comparatively heavy loading lever. The required application of a force can thus, during the actuation, easily cause the apparatus to be shifted out of position.

It is known, in using such handles, to energise a motor which drives other transport means in the apparatus.

The present invention enables the operating element to be actuated not by hand but by the motor in the apparatus, all necessary operations being initiated automatically on actuation of a control element, i.e. a switch. In this way force is unnecessary and a loaded-lever mechanism is avoided since it is only necessary to actuate a control element.

According to the present invention, a drive connection provided between the drive motor and the operating member is arranged to adjust the operating element immediately after starting of the drive motor and to return the operating member to an initial position after switching off of the apparatus immediately before the stopping of the drive motor.

Such adjustment by the motor was previously unknown, especially since the sequence previously used, in which an actuating member for the operating element was first moved and the motor was thereby energised, is reversed in a novel manner.

According to one advantageous embodiment, the drive connection comprises a mechanical coupling device which is operative according to the amount of the adjustment of the operating element to transmit the rotation of the motor only into the adjustment region of the operating element.

By this feature a difficulty is overcome which could not previously be avoided.

The apparatus may include a drive motor control circuit having start and stop switches connected in parallel, of which one is actuatable in dependence on the adjustment of a control grip and the other in dependence on the adjustment of the operating element, the latter switch being arranged to effect a sufficiently long subsequent running of the motor after return of the control grip to return the operating element to its initial position. In this way, by means of a simple alteration of the electrical switching circuit the requirments for a comparatively easily developed arrangement are provided. It is however pointed out that the invention embraces other means for ensuring a sufficient subsequent running or a delayed switching off.

The drive connection preferably includes a motor driven disc associated with a control lever drivable with a reduction from the crank, a coupling lever being pivotally mounted on the control lever and movable into the path of a projection on the crank disc. One side of the control lever may be provided with a runner co-operating with the projection, which runner is arranged, after pivoting of the control lever for adjustment of the operating element, to move from the path of the projection.

The coupling lever may be arranged to move from the path of the projection on adjustment of the operating element so that the latter is movable past the connecting lever, while return of the connecting lever to a countersupport provides an abutment for the projection for driving the control lever to return the operating element. The outward movement can be brought about by a gravity effect or also by means of an under support by a spring.

Advantageously, a resilient pulling connection, preferably in the form of a dead-point snap device, is provided between the control grip and a lever, and such lever includes an abutment for connecting the connecting lever. In this way switching obstructions are avoided.

Preferably, a guide lever for the operating element is coupled with the control lever, for example, by a cam slot connection, and the guide lever and the connection lever are arranged with respect to one another and dimensioned to effect a return of the control lever by the guide lever, for example, by means of a reaction force from the operating element, so that on adjustment the guide lever and the connection lever are moved through a dead-point position.

In this case, the control lever and the guide lever may both be pivotable through about 90°, and, pivotable to the axis of pivotation of the guide lever, a drive lever for the operating element may be mounted with a pulling connection with the guide lever such that, on pivotation of the guide lever, the drive lever pivots through only a part of the angle of pivotation of the guide lever. This is an important feature for a simple lost motion arrangement.

Further advantages and features of the invention appear from the following illustration and an exemplary embodiment thereof, which is shown in the drawings and the functioning of which is described hereafter.

In the drawings:
FIGURE 1a shows a side view of an apparatus with a side wall removed to illustrate parts of the apparatus in an initial position;
FIGURE 1b shows a section taken through the apparatus behind the wall shown in FIGURE 1a;
FIGURES 2a and 2b show views corresponding to FIGURES 1a and 1b but with the parts in their positions in which the operating element is actuated;
FIGURE 3 shows a view corresponding to FIGURES 1a and 1b but with parts in an intermediate position for preparing the return of the operating element; and
FIGURES 4a, 4b and 4c are circuit diagrams of the motor control, illustrating the several switching operations.

It is pointed out that switch 13 is closed when its actuating element is drawn into the switch housing, while the switch 33 is closed when its actuating element projects free of its housing. It is also to be noted that control grip 50 is mounted in a known manner on a switching plate indicated by reference numeral 4 and projects through an opening in the outer wall of the apparatus, which outer wall has been omitted from FIGURE 1a.

The directions of rotation referred to relate to a plan view of FIGURES 1a, 2a and 3.

In FIGURES 1a and 1b, the apparatus is in an initial, inoperative or rest condition, i.e. drive motor 2 is stationary and bag pressure plate 3 is disposed in its uppermost position.

In FIGURES 2a and 2b the apparatus is in its operating condition, i.e. the drive motor 2 is running and the pressure plate 3 is in its lowermost position.

The apparatus shown in the drawings has a wall 1, which is an intermediate or mounting wall. At a spacing from this wall, i.e. with reference to FIGURES 1a and 2a in front of this wall, there is disposed a side or outer wall, which is not illustrated and which the mounting wall 1 forms an intermediate chamber for receiving the drive and control units illustrated. The parts shown in FIGURES 1b and 2b are located on the other side of the intermediate or mounting wall 1.

A further side or outer wall 65 is connected with the mounting or intermediate wall 1 by a base 51. Above this base 51, a developer dish or tray 36 and a supply container are arranged, the supply container being illustrated as a developer bag 34 (FIG. 16). In addition, operating elements required therefor are provided in this region. It is to be understood that end walls can also be provided, although these are not shown in the drawings.

The construction of the apparatus will be described below with reference to its function.

Starting

In the mounting or intermediate wall there is fixedly mounted a tubular member 6 (FIGS. 1a and 2a). A switching plate 4 is loosely movably, i.e. freely rotatably, arranged on this tubular member and this plate 4 has a substantially triangular shape with a cut-away portion 52 extending concentrically with the tubular member 6 between abutment edges 53, 54 (FIG. 3). At the opposite corner of the plate 4 there is provided a spring-securing pin 7. The plate 4 is preferably provided with a pin 5 acting as a pivot, which is inserted into the opening of the tubular member 6 so that the plate 4 is journalled in this tubular member.

In the intermediate or mounting wall 1 there is fixed or riveted a pin 8 which projects into the cutaway portion 52 of the plate 4. Pivoting of the plate 4 is therefore limited by abutment of the pin 8 against the abutment edges 53, 54.

On the tubular member 6 there is loosely rotatably mounted a lever 9 and a spring-securing bolt 10 for a compression spring 11 is secured in the upper third of this lever 9. The compression spring 11 is illustrated as a bow-shaped spring and between the spring securing pin 10 and the previously mentioned securing pin 7.

In the lever 9 there is provided a bore 12 through which the pin 8 extends. This bore 12 has a larger diameter than the pin 8, so that the lever 9 is rotatable about the tubular member 6 through an amount corresponding to the difference in diameters of the pin 8 and the boring 12. In the position illustrated in FIGURE 1, the plate 4 is in its left-hand position. The lever 9 is thus in its right-hand position. The connection between the lever 9 and the cam 4 by the spring 11 produces dead-point device. On adjustment of the plate 4 in a clockwise direction corresponding to the length of the cutaway portion 52, the spring retaining pin 7 passes through the line connecting the pivot pin 5 and the spring securing pin 10 to the right-hand side of this connecting line, so that the lever 9 is swung to the left and is resiliently held in this position. When the plate 4 has been pivoted to the right into the position shown in FIGURE 2, the spring securing pin 7 is moved so far to the right that the spring 11 presses the lever 9 to the left through the spring securing pin 10. The pivoting of the lever 9 is limited by the bore 12. On leftward rotation of the lever 9, the lower right-hand edge of the lever strikes a microswitch 13 which is mounted on the intermediate or mounting wall and has a switching element 55 in the path of movement of the lever 9. In this way, a circuit is closed.

This circuit is the circuit for the motor 2, which is arranged in a so-called mounting chamber and of which a cooling blade is for example indicated. The motor 2 drives a crank disc 16 through a pinion 14 and an intermediate gear 15. The intermediate gear 15 and the crank disc 16 are rotatably mounted on the intermediate or mounting wall 1. The journal for the crank disc is indicated as a securing bolt 17 which is fixedly connected with the wall 1. On the crank disc 16 there is fixedly secured a projection such as a pin 18 on which a roller 19 (of plastic material) is rotatably mounted. In the intermediate or mounting wall there is also fixedly arranged a mounting pin 40. A control lever 20 above the crank disc 16 is arranged so that it can pivot about the pin 40, and at the lower, straight side of the control lever 20 there are provided runners 21 and 22. These runners extend perpendicular to the plane of the drawing and are disposed in predetermined positions in the path of the roller 19.

The control lever 20 is for example provided with a guide sleeve 23 mounted on the pin 40. At the left-hand side of the control lever, a guide bolt 24 is arranged perpendicular to the plane of the drawing and extends from a guide roller 25. This guide roller runs in a slot 66 for guiding both sides of guide lever 28. In the middle of the control lever 20, an abutment bolt 26 is arranged against which a coupling lever 27 can abut. The coupling lever 27 is freely rotatable on the guide sleeve. It is thus—apart from the abutment means in front of it—as rotatable as the control lever 20. A mounting portion is indicated by reference numeral 56. From this mounting portion a tongue 45 extends at an angle of about 180° with respect to the coupling lever 27 and co-operates with a flange 41 on the lever 9; this flange can act as an abutment for the tongue 45.

In the intermediate wall there is rotatably mounted a pin 57. This mounting pin 57 projects through the intermediate wall. In the apparatus or control space the mounting pin 57 is provided at a spacing from the wall with a flattened section 29 (FIGURES 1a and 2a). On the opposite side of the mounting or intermediate wall, which is shown in FIGURES 1b and 2b, the pin 57 is formed as a four-sided pin 58. This serves for non-rotatably fixing a spring plate 31, which as described below effects the compression of a reserve container 34 by means of a pressure plate 3. A guide lever 28 is freely rotatably mounted on the cylindrical portion of the pin 57 adjacent the flattened pin section 29, and a lever 30 is non-rotatably connected with the pin 57 at this flattend section 29, the lever 30 being for example pressed onto the pin 57. The guide lever 28 moves, under the action of the crank disc 16 and the control lever 20, through 90°. The four-sided pin section 58, connected with the spring 31 and the pressure plate 3, rotates to the right through 60°. In order to compensate for the difference between the angular movements of the guide lever 28 and the four-sided pin 54, driver edges 43, 54 are provided spaced apart on the lever 30 by a spacing greater than the width of the lever 28 so that the angular difference of 30° between the above-mentioned 90° and 60° is taken-up.

On starting of the motor, the crank disc 16 rotates in the direction of arrow 59, and the roller 19 presses against the runner 21 and moves the lever 20 downwardly. The guide roller 25 pivots the lever 28 to the right, and the abutment edge 44 of the lever 28 drives lever 30.

The switch 33 is fixed to the mounting or intermediate wall and has a switch finger 32 which co-operates with the lower right-hand edge of the guide lever 28. When the switch finger 32 is actuated, the switch 33 is opened.

By the above-described movement of the guide lever 28, the lower right-hand edge thereof releases the switch finger 32 and closes the switch 33. When the control lever 20 and the guide lever 28 have reached their opposite end position (FIGURE 2a), the coupling lever 27 which moves freely on the guide sleeve 23, swings under its own weight or with the assistance of a spring 60 to the opposite side of the path of movement of the roller 19, as can be seen from FIGURE 2a.

The plastic roller 19 can rotate freely as can be seen from FIGURE 2a. The above-described movements stress the spring plate 31. The spring plate 31, which is secured to the pressure plate 3, compresses the developer bag 34 and supplies the developer fluid into a developer dish 36 through the sleeve piece 35. Both switches 13 and 33 are then closed.

By referring to FIGURE 1b it can be seen that guide elements 60 are arranged in a known manner in the developer dish 36. By means of these guide elements 60, copy papers can be guided from an inlet 61, and over guide elements 62 into squeezing and transport rollers 38, 39 mounted in walls of the apparatus extending parallel to the plane of the drawing, and outlet 63 being located above the rollers 38, 39. From the rotating intermediate gear 15 mounted on the intermediate wall, the squeezing and transport rollers 38, 39 are driven via a further intermediate gear 37 mounted on the intermediate wall.

The above description shows how on starting of the motor and by means of two motor switches actuatable by different parts, the pressure plate 3, for example, is moved through a predetermined amount and this movement is terminated after a predetermined amount, while the further running of the motor ensures the operation of the apparatus. In this way the continuation of movement from a rotation of the pin 57 through 60° to a rotation of the lever through 90° is effected.

To complete the description of the construction of the apparatus, it is noted with reference to FIGURE 1 that beneath the disc 36 there is arranged an upwardly-open container 64. In this container 64 the pressure plate 3 is movable, the so-called developer bag 34 disposed, being beneath the pressure plate 3 and being a flexible bladder filled with developer liquid. The connecting pipe 35, i.e. the so-called sleeve piece, extends from the bag 34 to the lowermost portion of the developer dish 36.

The uppermost position of the spring plate 31 is determined by an abutment 42, i.e. a so-called cross rod, which is mounted in the mounting or intermediate wall 2.

*Stopping*

When the apparatus is to be switched off, the plate 4 is rotated to the left. By this movement the spring securing pin 7 is shifted so far to the left that the spring 11 rotates the spring securing pin 10 with the lever 9 to the right. At the top of the lever 9 the flange 41 is tilted, which on right-hand rotation of the tongue 45 of the coupling lever 27 presses the spring 60 to the right and thus shifts the coupling lever 27, as shown in FIGURE 3, onto the abutment bolt 26.

By the movement of the lever 9 the lower right-hand side of the lever 9 rises from the switch 13. The contacts of the switch 13 are thereby opened (circuit diagram of FIG. 4c). The rotating plastic roller 19 runs into the U-shaped intermediate space formed by the runner 22 and the coupling lever 27. On further movement of the crank disc 16 the plastics material roller 19 presses against the coupling lever 27, which moves the control lever 20 to the left by means of the abutment pin 26.

The upward movement of the lever 20, effects through the guide roller 25, a leftward rotation of the lever 28. Through lever 30, the latter rotates the four-sided pin 58 and thus the displaced pressure plate in an upward movement. Before the spring plate 31 has reached its uppermost position it rests lightly stressed against the cross rod 42. Thus on movement of the apparatus undesirable vibration of the pressure plate 3 is avoided. The partial vacuum produced in the bag due to the discharging of the bag causes the developer liquid to flow back from the developer dish 36 through the sleeve piece 35 into the bag. Before the control lever 20 has reached its uppermost position the lower right-hand edge of the guide lever 28 presses the switch finger 32 downwardly and thus opens the switch contacts of the switch 33.

Since both the contacts of the switch 33 and also those of the switch 13 are open, the drive motor comes to rest (see circuit diagram of FIGURE 4a).

The mechanical-electrical bag compressing device can be used in devices through which sheets are transported as well as in book copying devices with different format sizes.

Figure 1A:
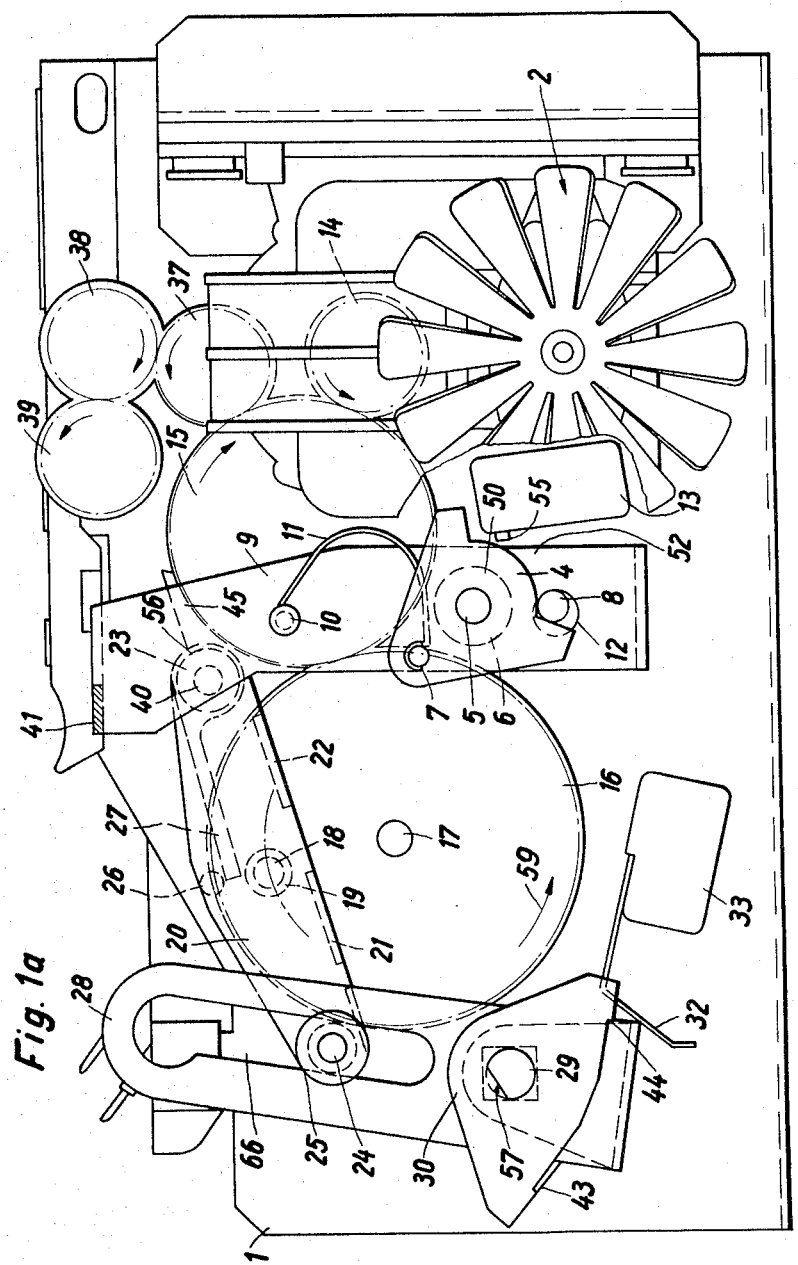
Figure 4A:
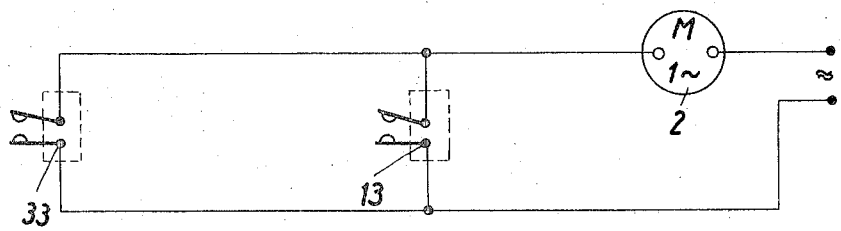
FIGURE 4 shows schematic circuit diagrams. The circuit diagram in FIGURE 4a shows the motor circuit corresponding to the operative condition of FIGURE 1a, i.e. both switches 13 and 33 are open.
FIGURE 4b shows the motor circuit corresponding to the operating condition in FIGURE 2a, i.e. after pivoting has taken place and during running of the motor for driving the apparatus. The two switches 13, 33 are closed.
Figure 4B:
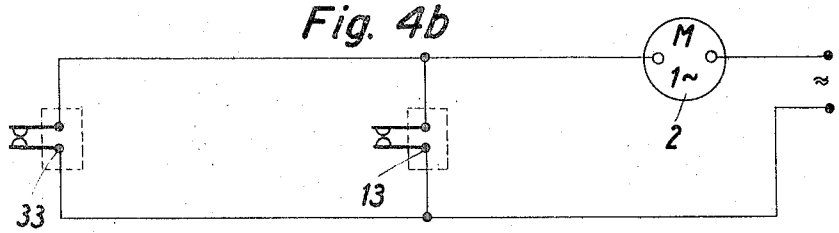
Figure 4C:
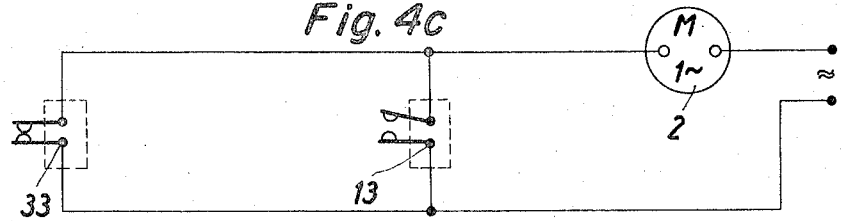

FIGURE 4 shows the operating condition of the apparatus after the plate 4, i.e. the associated hand lever 50, has been drawn back into the stop position (FIGURES 1a and 3), the supply bag 33 still being compressed. In this position the switch 13 is already opened as described by the pivotation by the lever 9. The motor however is maintained in operation by the switch 33, which is associated with the compressing device for the supply bag 34, until this device has returned to its initial position. In the example described, the operative element is the compressing device for the bag. However, the invention also includes other arrangements, for example a switching operation or an additional transport process can be initiated. The preferred embodiment however lies in the compression device or a device which can be actuated through a limited angle with simultaneous stressing of the spring.

In another preferred embodiment which will not be described in detail, the operative element is an apparatus lid which covers inlet and outlet openings and is first raised after starting of the apparatus and is lowered on stopping of the apparatus. This lid can be arranged on the four-sided pin 58. Since this four-sided pin rotates through 60°, a corresponding lid movement can be effected. By alteration of the abutments 43, 44 a further rotation of up to 90° can be obtained. No further details will be given of the lid since without special additional means it can be applied to the illustrated construction and moved and since it is not intended to limit the invention with respect to the operative element to the spring pressure plate 31.

We claim:

1. In a copying apparatus, in combination: a frame, transport means for feeding copy material through said frame; a drive motor mounted in said frame for driving said transport means; an operating element mounted for limited movement in said frame, said operating element being arranged to be moved before the carrying out of a copy operation in the copying apparatus from the first position to a second position and to be returned after termination of said copying operation from said second position into said first position; a drive connection between said drive motor and said operating element, said drive connection being mounted in said frame; switch means for energizing and de-energizing said drive motor, said drive connection being constructed and arranged such that upon energization of said drive motor said operating element initially moves through a predetermined angle from said first position into said second position, whereupon said drive motor and said transport means are further driven, while after de-energization said drive connection maintains further running of said motor; and connecting means between said switch means and said drive connection whereby movement of said drive connection to selectively engage and disengage said drive connection ensures the further running of said motor until said operating element has reached its first position, said switch means being connected in circuit with said motor and including two start-and-stop switch means connected in parallel, one of said start and stop switch means being actuable in dependence on the position of an actuating element arranged in said frame and the other of said start-and-stop switch means being actuatable in dependence on the position of said operating element, said other start-and-stop switch means, after movement of said actuating element for said one of said start-and-stop switch means into the open position, ensuring a further running of said motor during a period in which said operating element is moved back into said first position.

2. The combination defined in claim 1, wherein between an actuating element for one of said start-and-stop switch means and said drive connection there is provided a pulling device resiliently arranged as a dead-point snap device, which pulling device is disposed between a support for said actuating element and a lever which is movably mounted in said frame, and which in one position actuates one of said start-and-stop switch means and in another position engages said drive connection for moving a connection lever of said drive connection into a predetermined position.

3. In a copying apparatus, in combination: a frame, transport means for feeding copy material through said frame; a drive motor mounted in said frame for driving said transport means; an operating element mounted for limited movement in said frame, said operating element being arranged to be moved before the carrying out of a copy operation in the copying apparatus from the first position to a second position and to be returned after termination of said copying operation from said second position into said first position; a drive connection between said drive motor and said operating element, said drive connection being mounted in said frame; switch means for energizing and de-energizing said drive motor, said drive connection being constructed and arranged such that upon energization of said drive motor said operating element initially moves through a predetermined angle from said first position into said second position, whereupon said drive motor and said transport means are further driven, while after de-energization said drive connection maintains further running of said motor; and connecting means between said switch means and said drive connection whereby movement of said drive connection to selectively engage and disengage said drive connection ensures the further running of said motor until drive connection comprising a crank disc rotatably mounted in said frame and drivable by said drive motor, lever means shifted by said disc and including a control lever pivotally mounted in said frame, and engagement means between said control lever and a crank of said crank disc for selective movement of said control lever between a first position and a second position, said lever means acting upon said switch means for operating same.

4. The construction defined in claim 3, wherein said engagement means comprises a coupling lever pivotally mounted in said frame, said coupling lever and said control lever being pivotable about a common axis and said crank of said crank disc being so guided that it engages said control lever in one position of said control lever and passes by said control lever in another position of said control lever.

5. The combination defined in claim 4, wherein said control lever has a runner fixedly arranged thereon and perpendicular to its length directed in the path of movement in said crank, said runner lying in the path of movement of said crank in one position of said control lever and in another position of said control lever being moved from the path of movement of said crank.

6. The combination defined in claim 3, wherein a spring member is arranged between said coupling lever and said frame and an abutment is provided on said control lever, said spring urging said coupling lever onto said abutment, said coupling lever being provided with a tongue and said switch means having a projection which can come into engagement with said tongue and is movable in dependence on the adjustment of said actuating element into a position corresponding to stopping of said motor for moving said connecting lever against the action of said spring into a position such that it comes into contact with said abutment.

7. The combination defined in claim 3, wherein said operating element is a spring plate for a flexible supply container for developer liquid mounted in said frame and is pivotal through an angle of approximately 90°, said spring plate being moved by said drive motor after energization of said drive motor into said second position for compressing said supply container and remaining in such position until said drive motor is de-energized, said switch means for said drive motor including a control switch actuatable in dependence on the position of said spring plate.

8. In a copying apparatus, in combination: a frame, transport means for feeding copy material through said frame; a drive motor mounted in said frame for driving said transport means; an operating element mounted for limited movement in said frame, said operating element being arranged to be moved before the carrying out of a copy operation in the copying apparatus from a first position to a second position and to be returned after termination of said copying operation from said second position into said first position; a drive connection between said drive motor and said operating element, said drive connection being mounted in said frame; switch means for energizing and de-energizing said drive motor, said drive connection being constructed and arranged such that upon energization of said drive motor said operating element initially moves through a predetermined angle from said first position into said second position, whereupon said drive motor and said transport means are further driven, while after de-energization said drive connection maintains further running of said motor; and connecting means between said switch means and said drive connection whereby movement of said drive connection to selectively engage and disengage said drive connection ensures the further running of said motor until said operating element has reached its first position, said switch means being connected in circuit with said motor and including two start-and-stop switch means connected in parallel, one of said start-and-stop switch means being actuatable in dependence on the position of an actuating element arranged in said frame and the other of said start-and-stop switch means being actuatable in dependence on the position of said operating element, said other start-and-stop switch means, after movement of said actuating element for said one of said start-and-stop switch means into the open position, ensuring a further running of said motor during a period in which said operating element is moved back into said first position, said drive connection comprising a crank disc pivotally mounted in said frame and drivable by said motor, a control lever pivotally mounted on said frame, engagement means between said control lever and a crank of said crank disc for selectively moving said control lever between a first position and a second position, a guide lever pivotally mounted on said frame, a rotary shaft mounted in said frame and co-operating with said guide lever, said operating element being fixed to said rotary shaft, said guide lever being movably coupled with said control lever through a cam-slot connection, said guide lever and said control lever being so arranged and dimensioned that a return of said control lever by said guide lever due to the reaction force of said actuating element is effected by a dead-point position being passed through on adjustment of both levers.

9. The combination defined in claim 8, wherein said control lever and said guide means are pivotable through substantially 90° and a drive lever for said operating element is pivotally mounted concentrically of the axis of pivoting of said guide lever with pulling connection arrangement to said guide lever so that the drive lever, on pivoting of said guide lever pivots through only a part of the angle of pivoting of said guide lever.

10. The combination defined in claim 9, wherein said operating element is a spring plate for a flexible supply container for developer liquid which is mounted in said frame, and wherein an actuating arm of said pressure plate is connected with said drive lever and said pressure plate is associated with an upper abutment against which said pressure plate abuts under stress in its raised position.

11. The combination defined in claim 8, wherein said other start-and-stop switch means is actuatable by said guide lever so that this switch is opened in the stop position and closed in the start position, an elongate switch finger being provided for holding said other start-and-stop switch means closed during at least a substantial part of the return movement of said guide lever.

12. In a copying apparatus, in combination:
housing means;
developing means in said housing means for treating a layer of copying material with a developer;
transport-roller means journaled in said housing means for advancing said layer of copying material through said developing means;
a drive motor in said housing means operatively connected with said transport-roller means for driving same during operation of said motor;
an operating element movably mounted in said housing means and actuatable for supplying developer to and removing it from said developing means in first and second positions of said operating element, respectively;
circuit means connected to said motor for starting and stopping same, said circuit means including
first switch means, and
second switch means connected in parallel with said first switch means for energizing said motor upon closure of either of said switch means and de-energizing said motor upon opening of both said switch means;
a first switch-actuating element co-operating with said first switch means and mounted in said housing means for movement between a first position wherein said first switch means is opened and a second position wherein said first switch means is closed;
a pivot shaft for said operating element rotatably mounted in said housing means and swingable with said operating element;
a second switch-actuating element connected with said pivot shaft and co-operating with said second switch means for operating same to open said second switch means upon movement of said operating element from said second position to said first position thereof and to maintain said second switch means closed subsequent to the movement of said operating element from said first position to said second position thereof; and
crank transmission means connecting said motor with said pivot shaft for swinging said operating element between said positions thereof.

References Cited by the Examiner
UNITED STATES PATENTS

| | | | |
|---|---|---|---|
| 3,062,123 | 11/1962 | Limberger | 95—89 |
| 3,145,635 | 8/1964 | Gugelot et al. | 95—89 X |
| 3,165,998 | 1/1965 | Reick | 95—89 |
| 3,203,336 | 8/1965 | Limberger | 95—89 |

NORTON ANSHER, *Primary Examiner.*

CLIFFORD B. PRICE, *Examiner.*